A. C. BRIXEN.
COW TAIL HOLDER.
APPLICATION FILED JUNE 11, 1921.
1,395,700.
Patented Nov. 1, 1921.
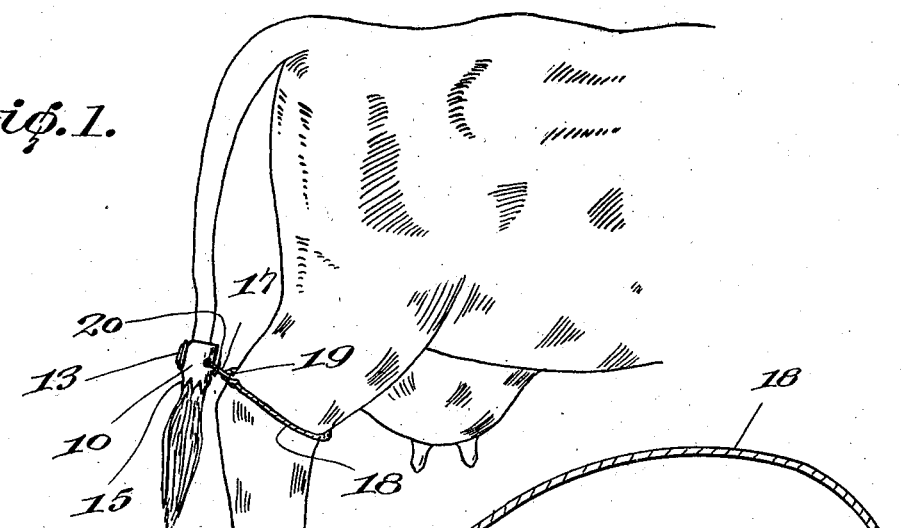
Fig. 1.
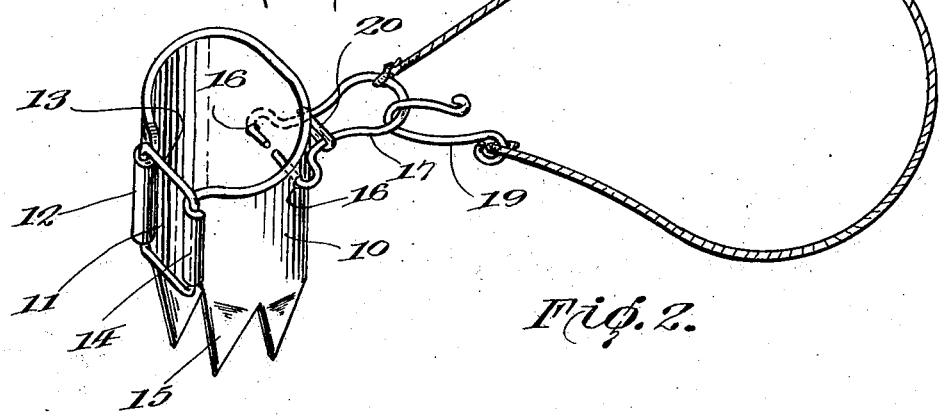
Fig. 2.
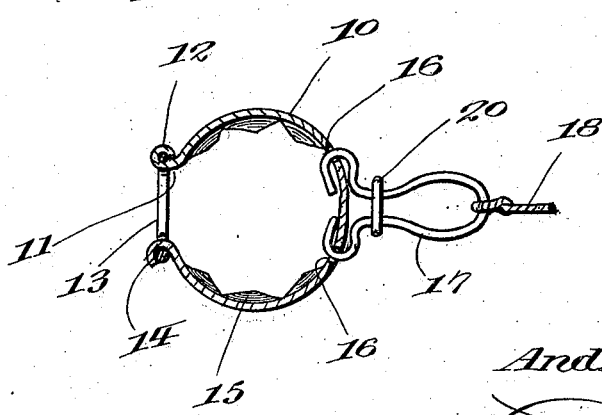
Fig. 3.
Inventor:
Andrew C. Brixen.
Attorneys.

UNITED STATES PATENT OFFICE.

ANDREW C. BRIXEN, OF WESTMOND, IDAHO, ASSIGNOR OF ONE-HALF TO P. A. NELSON, OF SANDPOINT, IDAHO.

COW-TAIL HOLDER.

1,395,700.     Specification of Letters Patent.     Patented Nov. 1, 1921.

Application filed June 11, 1921. Serial No. 476,875.

*To all whom it may concern:*

Be it known that I, ANDREW C. BRIXEN, a citizen of the United States, residing at Westmond, in the county of Bonner, State of Idaho, have invented certain new and useful Improvements in Cow-Tail Holders; and I do hereby declare the following to be a full, clear, and exact description of the invention, such as will enable others skilled in the art to which it appertains to make and use the same.

This invention relates to new and useful improvements in tail holders and particularly to cow tail holders.

One object of the invention is to provide a cow tail holder which is simple in construction, cheap to manufacture, and which can be easily and quickly applied to or removed from the cow's tail.

Another object is to provide a device of this character which will not be easily dislodged from the tail, and which will securely hold the tail from being switched.

Other objects and advantages will be apparent from the following description when taken in connection with the accompanying drawing.

In the drawing:

Figure 1 is an elevation of the device in applied position.

Fig. 2 is an enlarged perspective view of the device removed from the cow.

Fig. 3 is a horizontal transverse central section through the device.

Referring particularly to the accompanying drawing, 10 represents an open-ended cylinder formed from metal or other desired material, and being longitudinally split along one side, as shown at 11. At one side of the split the end of the metal sheet is formed with a longitudinal tubular portion 12 in which are engaged the inturned ends of the approximately rectangular bail 13. The portion of the cylinder, at the other side of the split, is formed with a hook 14 which is adapted to be engaged with the bail, when the cylinder is disposed in encircling relation around the cow's tail. One end of the cylinder 10 is formed with a series of prongs or tines 15, which, when the cylinder is engaged on the tail, are directed downwardly toward the end of the tail, so as to engage in the hair at the end of the tail, and thus prevent the device being accidentally slipped from the tail.

In the opposite side of the cylinder there are formed the openings 16, and engaged in these openings are the inturned ends of the wire loop 17. To this loop is connected one end of a cord or rope 18, the other end of the rope having a hook 19 secured thereto, for engagement with a portion of the rope when the rope is passed around one of the cow's hind legs. Thus the tail will be firmly held against movement by the cow, and the milker protected from being struck in the face, as well as to prevent foreign matter getting into the milk.

It will be noted that the prongs or tines are bent inwardly to a slight degree, so that they will obtain a better hold on the hairy portion of the tail, to prevent slipping of the device from the tail, when the cow attempts to switch the tail.

Engaged around the legs of the loop 17, adjacent the cylinder, is a ring 20, which prevents the inturned ends of the loop being disengaged from the openings of the cylinder.

What is claimed is:

A cow tail holder comprising an open-ended and longitudinally split tail encircling cylinder, a bail pivotally carried by the cylinder at one side of the split, a hook carried by the cylinder at the other side of the split for engagement by the bail, one end of the cylinder having longitudinally and inwardly extending hair engaging prongs, a loop pivotally carried by the side of the cylinder opposite the split, and a leg engaging means carried by the loop.

In testimony whereof, I affix my signature in the presence of two witnesses.

ANDREW C. BRIXEN.

Witnesses:
SIDNEY H. SMITH,
W. W. PICKETT.